United States Patent
Thomas et al.

(10) Patent No.: US 7,092,974 B2
(45) Date of Patent: Aug. 15, 2006

(54) DIGITAL ASSET SERVER AND ASSET MANAGEMENT SYSTEM

(75) Inventors: Mark Ivan Thomas, Auckland (NZ); David Gideon Dauncey, Auckland (NZ); Michael Sutherland Lynch, Los Angeles, CA (US)

(73) Assignee: Right Hemisphere Limited, Newmarket (NZ)

( * ) Notice: Subject to any disclaimer, the term of this patent is extended or adjusted under 35 U.S.C. 154(b) by 644 days.

(21) Appl. No.: 10/387,248

(22) Filed: Mar. 12, 2003

(65) Prior Publication Data

US 2004/0181548 A1   Sep. 16, 2004

(51) Int. Cl.
*G06F 17/00* (2006.01)
(52) U.S. Cl. .................. 707/203; 707/200
(58) Field of Classification Search .............. 707/1, 707/4, 201, 203, 200, 104.1; 380/231; 345/600; 709/227; 715/744, 762
See application file for complete search history.

(56) References Cited

U.S. PATENT DOCUMENTS

| | | | |
|---|---|---|---|
| 6,133,916 A | 10/2000 | Bukszar et al. | 345/660 |
| 6,281,874 B1 | 8/2001 | Sivan et al. | 715/744 |
| 6,326,962 B1 | 12/2001 | Szabo | 712/762 |
| 6,643,641 B1 * | 11/2003 | Snyder | 707/4 |
| 2002/0146122 A1 * | 10/2002 | Vestergaard | 380/231 |

OTHER PUBLICATIONS

Sclaroff et al., ImageRover: A Content-Based Image Browser for the World Wide Web, 1997 IEEE, pp. 2-9.*
Chaudhuri et al., Optimizing Queries over Multimedia Repositories, ACM 1996, pp. 91-102.*

* cited by examiner

*Primary Examiner*—Apu M. Mofiz
(74) *Attorney, Agent, or Firm*—Trexler, Bushnell, Giangiorgi, Blackstone & Marr, Ltd.

(57) ABSTRACT

The graphic file management system of the present invention provides users with the ability to control the complexity, flow, and quality (performance, ease of use, and scalability) of managing and usage of graphic files across enterprises. In particular, the system of the present invention allows for automated and dynamic repurposing (maintenance, use and manipulation) of large amounts of digital graphic data or files. The system comprises a server which can manipulate graphic files and establishes links to each graphic file, and a database on which the server stores the links. The server can create other formats of a particular graphic file and allows for amendments to graphic files to be tracked.

7 Claims, 9 Drawing Sheets

DIGITAL ASSET SERVER AND ASSET MANAGEMENT SYSTEM

FIELD OF THE INVENTION

The present invention is related to graphic files, such as electronic images and videos, 3D CAD data and other forms of digital image data and to a graphic file management system that allows users to open, view, process, alter and distribute or publish digital graphic files, information or data, creating dynamic and associative links from source data to potentially many published outputs. In particular, the present invention is designed for automated and dynamic repurposing of large amounts of digital graphic data or files.

PRIOR ART

It is known in the art to provide methods or systems for searching for and downloading digital graphical images. Systems are also known that allow access to image collections or databases holding such images. One such system is WebSeer™ (by the University of Chicago) that uses a sophisticated combination of contextual and visual cues to analyze and store information about images on the World Wide Web. Webseer is modeled after traditional search engine products, such as Alta Vista™ (by Digital Corporation) in that it creates its own indexed database at the web server site by navigating known websites and recording text as well as image related information. Webseer does this by using a Web crawler, which starts at one Web page and then moves to all the links on that page and then all the links on all the pages on those pages, etc. to move through the Web, in order to add numerous images a day to its data base. When the crawler finds an image on a Web page, it first analyzes the text, like the caption, the name of the image file, the title of the Web page, etc. to gather clues about what is actually in the image. It weighs the information according to how relevant it is likely to be (caption vs. page title, for example) and stores it. Next, WebSeer™ analyzes the image to determine whether it is a photograph or a drawing using information such as the file type, color, distinct boundaries, etc., in a "decision tree". WebSeer™ then searches for skin hues to determine whether or not there are people in an image. If so, it uses a neural network to locate each face in the image. WebSeer™ stores in its data base a thumbnail version of the image, its URL and the URL of the page it's on, along with information about the picture: whether it's a photograph or a drawing, how many faces and the file type of the image, etc.

Others known systems are CYPRESS and QBIC that allow web users to use their pre-designed image databases by connecting to their specific URL.

Such systems often reflect closed design strategies and offer little capability for sharing and a potential for duplication and inconsistency.

Although there are various systems that allow access and searching of various image databases or compilation of images or graphic files, such as 2 dimensional or 3 dimensional pictures, videos or the like, from the world wide web, often it is difficult for a user to access or open the graphic files in one or a number of applications as it is usually only accessible through the software on which it was created. Furthermore, while in some instances a user may be able to view a particular image he or she may not be able to edit the image.

SUMMARY OF INVENTION

It is an object of the present invention to provide a graphic data system that allows a user to open and alter graphic files or to at least provide the public with a useful choice or go some way to overcoming the disadvantages of the prior art.

Hereinafter reference to the words "graphic files" refer to 3 dimensional and 2 dimensional electronic images, compression techniques or formats, such as bitmaps or jpegs, geometry mesh data and the like, video electronic images such as mpeg or the like and any other electronic images or files.

Furthermore, reference to the word "server" refers to a hardware or software computer system that stores information and hosts computer applications and the like.

Accordingly in a first aspect the present invention consists in a graphic file management system that enables a user, having a computer connected to a computer network, to maintain, use and manipulate graphic files in a plurality of different electronic formats, which are stored on said computer network comprising:

a server which can manipulate said graphic files and establish a link to each of said graphic files, a database on said network in which said server stores said links, an interface that allows said user access to said server, said server being programmed to:

a) create at least one other file format for each of said graphic files when establishing said links, where said at least one other file format is accessible to said user through said interface and said server, b) allow a user to select a graphic file and select from the available formats for said file, c) create a copy of a file so selected by a user, d) allow the user to manipulate said selected file, e) create a link between said selected file and said manipulated copy of said selected file, f) allow a user to embed said manipulated file in another file, g) create a further link between said embedded file and said selected file, and h) update said embedded file through said further link if said manipulated file is further manipulated.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DETAILED DESCRIPTION OF THE PREFERRED EMBODIMENTS

Most complex digital graphic files, which are usually electronic computer files or image formats, are not easily accessed nor edited across applications or devices, as they are usually only accessible through the software on which they are created. The graphic file management system of the present invention allows a user of such electronic files to access, by way of a computer connected to a computer network, intranet or Internet, any type of graphic files, (for example, 2 dimensional (2D), 3 dimensional (3D), Video, etc.).

Furthermore, the development of graphic files and in particular, 3D image files is traditionally manual, for example, the maintaining of versions of files and the like. The server and system of the present invention gives a user the ability to search, access, manage, dynamically translate, process and encode, seamlessly author and integrate graphic files into standard business software applications across the entire business value chain (for example, design, manufacturing, marketing, sales, support, training, and partners/suppliers). It allows for the automated updating of all instances of usage of graphic files. Effectively, the system of the present invention automates the creation, storage and management, delivery and amendment ("complete workflow") of such files.

Traditionally 2D and particularly 3D digital graphical information or files have resided in pockets within an organization in formats and physical locations often inaccessible to sales, marketing and other company departments needing to use graphic files either internally or externally. The system of the present invention solves these issues and attempts to assist a broad range of companies in many fields to gain maximum benefit from their graphic files, in particular 2D and 3D images.

The system of the present invention provides users with the ability to control the complexity, flow, and quality (performance, ease of use, and scalability) of managing and usage of graphic files across enterprises. The system enables users to create cohesive communities where they can access, use and re-purpose any graphic files. For example, for users who use Computer Aided Design (CAD) applications to create graphic images or files, the system of the present invention allows the user to add animation to the images created, re-render 3D images to 2D images, or other changes that are required to alter the original graphical images to suit other purposes ("repurpose").

The graphic file management system of the present invention therefore allows novice graphic file users to open files from complicated software packages (for example, CAD and other animation packages that typically only experts know how to operate) and, with the click of a button, drop these images into simple office automation software like Microsoft Word™, PowerPoint™, HTML and web pages. The graphic files can also be easily displayed and interacted with in the application of the user's choice.

Prior art systems search and catalogue graphic files and make these available for a user to download and use. The graphic file management system of the present invention is able to search for graphic files from within a graphic file database, create other useful versions of the discovered graphic files, and then catalogue these versions in a database that is readily searchable. Furthermore, the system of the present invention may also create viewable only versions of graphical images, for example, viewpoint. The server does this by creating a temporary view version of the graphic file that will not be saved in the database.

Figure 1:
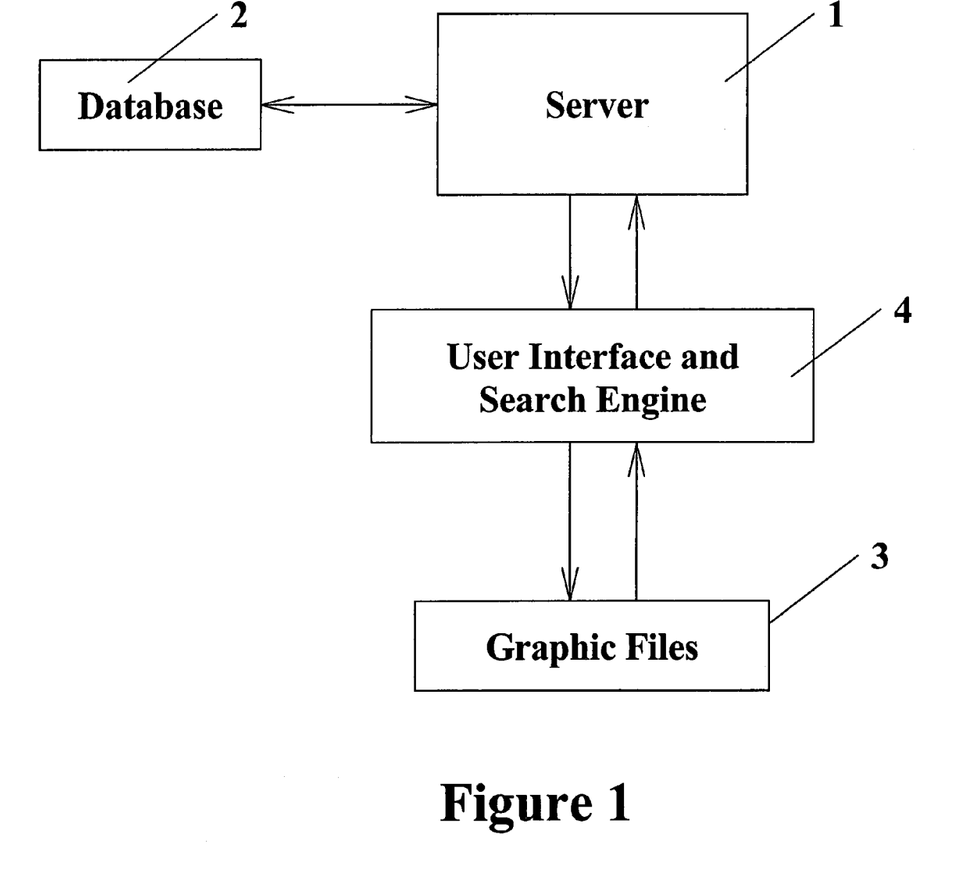
FIG. 1 shows a block diagram of the graphic file management system of the present invention.

Reference is now made to FIG. 1 that shows a block diagram of the system of the present invention. The graphic file management system is comprised of a server 1, database 2 for storing or maintaining a link to the graphic files and cataloguing graphic files 3 and a user interface and search engine 4 that enables users to search, view and download graphic files held or linked to in the database 2.

The server 1 is connected to or part of a computer network, intranet or Internet, and a user may access and use the server by utilizing a computer or work station connected to the computer network, intranet or Internet, and having a suitable user interface that allows access to the server.

The database 2, similar to prior art databases described above, also has the capability of storing graphic files as links or as representations in the "Universal Graphical Data Model" (UGDM), which can exist as an ASCII (XML) Binary or database file.

Figure 9:
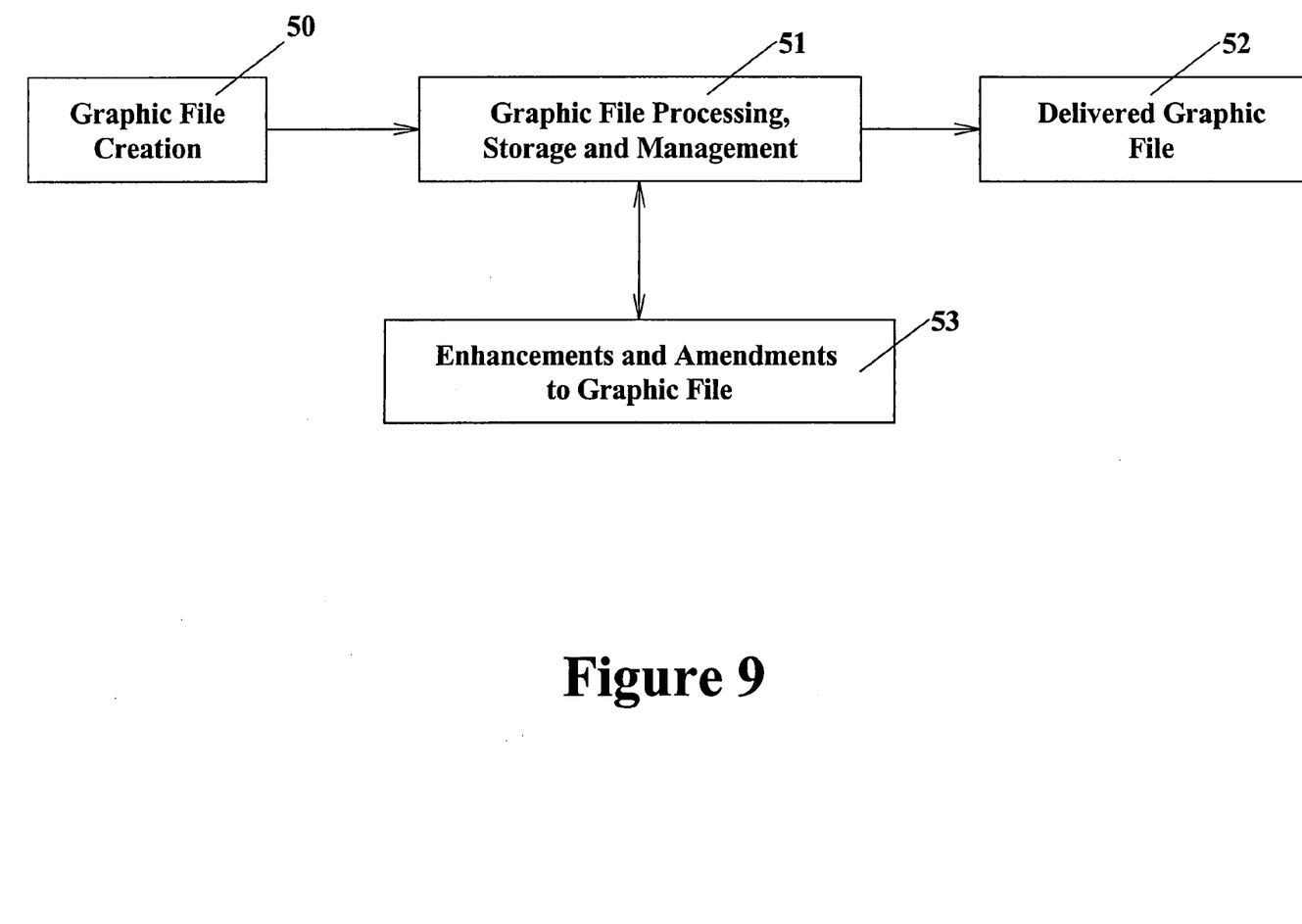
FIG. 9 is a flow diagram of typical graphic file workflows.

Referring now to FIG. 9 a flow diagram of the typical workflow of graphic files is shown. Use of graphic files typically moves through a workflow starting from the graphic files creation 50, then to data processing, storage and management 51, to the delivered file 52 (that is, use of the graphic file in published documents etc). In typical computer systems it is difficult to maintain graphic files, particularly updates and amendments to the files. The graphic file management system of the present invention works to process, store and manage 51 graphic files as well as enable the tracking of enhancements, updating and amendments 53 to graphic files stored in or linked to the server and database. The server also provides for version control of graphic files to ensure two separate users are not making conflicting changes to the same graphic file at the same time. The server effectively "checks-out" or file locks each graphic file when a user accesses the file to work on it. This prevents others from amending the files at the same time.

The database 2 stores relevant information that is searchable by way of the user interface and search engine 4 and enables a user to enter keywords relevant to a graphic file they are looking for. The information the database 2 stores about the graphic files includes detailed image attributes, such as polygon counts, texture information, as well as information about the graphic files electronic file size and date created.

When a search is performed by a user the search engine 4 interrogates the server 1 the server 1 then accesses the database 2 and returns graphic files, usually a 2D or 3D images or models, which meet the search criteria. A thumbnail view of each image or model meeting the search criteria is displayed on the user interface. The user interface may be a website on the internet or a particular software application capable of displaying the images or models. Furthermore, a user may then select to preview a particular image or model, by using their mouse on their computer or work station, and clicking on the image or model within the website or application. The user then has the opportunity to view other formats of each of the image or model created by the server upon upload of each image or model into the server.

As an example, if a user wishes to upload a particular 3D image, say a CAD model file, via the user interface 4, the user can upload the file onto the server 1 at which stage the server 1 will automatically convert the file into at least one other format that is more easily readable by a large number of programs (for example .OBJ format). The server 1 also automatically creates two or more simplified versions of the file along with a thumbnail view of the file. These simplified versions are made by simplifying or altering the graphic files, for example, by lowering the polygon count or approximating Nurb patches with polygons of the original image or model while maintaining its overall shape. For example, all the screw holes and welding fillets may be removed from a 3D model and the perfect curves may be simplified to a number of straight lines. These simplified versions of files are referred to herein as LOD files or 'level of detail' files. Particularly, the server 1 generates a number of LOD files each at a different level of detail and displays these for a user to view, select and use. Each of the versions of the model created by the server exists as a new independent entity and may be accessed by a user, downloaded from the server and used in other applications, such as publishing applications and the like. In other forms of the graphic file management system a user may set the server to create some versions of graphic files that are only viewable and thus can only be viewed by way of looking at or searching for the original data.

A further example of the server 1 automatically converting and repurposing graphic files based on varying requirements for display and file transfer follows. A 500 MB CAD model may be automatically converted to 3 levels of detail, a 200 MB high resolution version for internal visualization, a 50 MB version for external presentation and a 2 MB version for Internet display. All versions remain linked and are automatically updated if the original electronic file is updated. This automated processing of files may include; polygonal or other geometry compression or reduction, automatic UV mapping and texturing of parts, automatic extraction and display of parts lists or linking methods to external databases, on any other kind of automated processing of the image or model for the purposes of optimized viewing, processing or file transfer.

The graphic file management system of the present invention adds value to graphic information or files by extracting information from the electronic source file that represents each image or model, for example. As an example, such information that can be extracted by the server is the polygon count and object count. In the past this information has only been available to the source file system, if at all and even then this information may have been locked away and not made widely available. Therefore, with this type of information being available the server can search through this information.

User Interface

Figure 2:
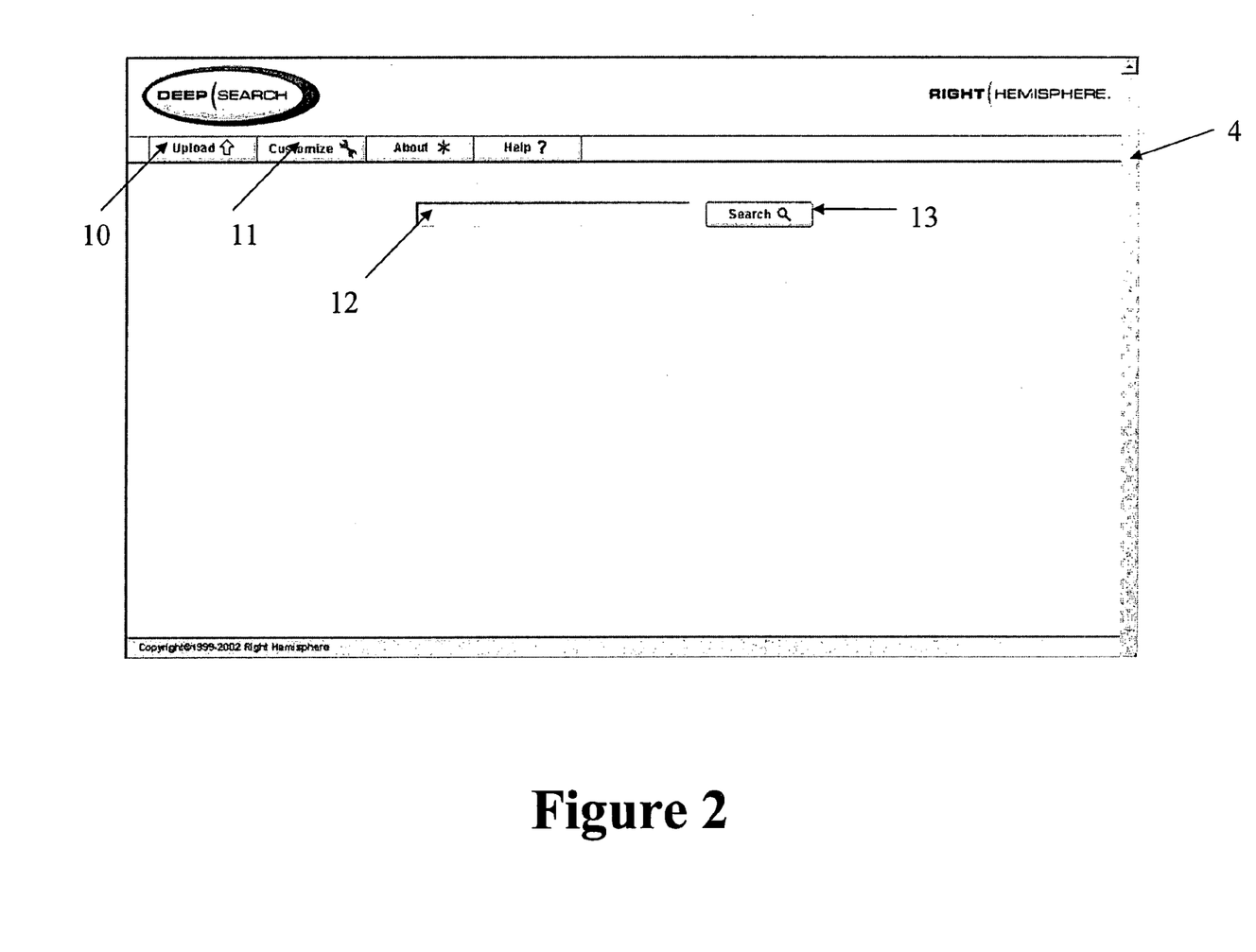
FIG. 2 is an example of the user interface screen provided with the graphic file management system of the present invention, where a user may enter a search term in order to search for graphic files from a graphic file database.

FIG. 2 shows an example of one embodiment the user interface 4 for the graphic file management system of the present invention. The user interface 4 has an upload button 10 that provides the user with the capability of uploading files to the server 1 and database 2 of the present invention. The user interface 4 is also provided with a customize button 11 that enables the user to customize the look and feel of the user interface. When a user wishes to search the server 1 and database 2 for graphic files 3 the user is required to enter a keyword, using the keyboard on their computer or workstation, that could be used to describe the graphic files the user is looking for, in entry box 12 and select (using their mouse) the search button 13 to cause the server to search through the database 2.

Figure 3:
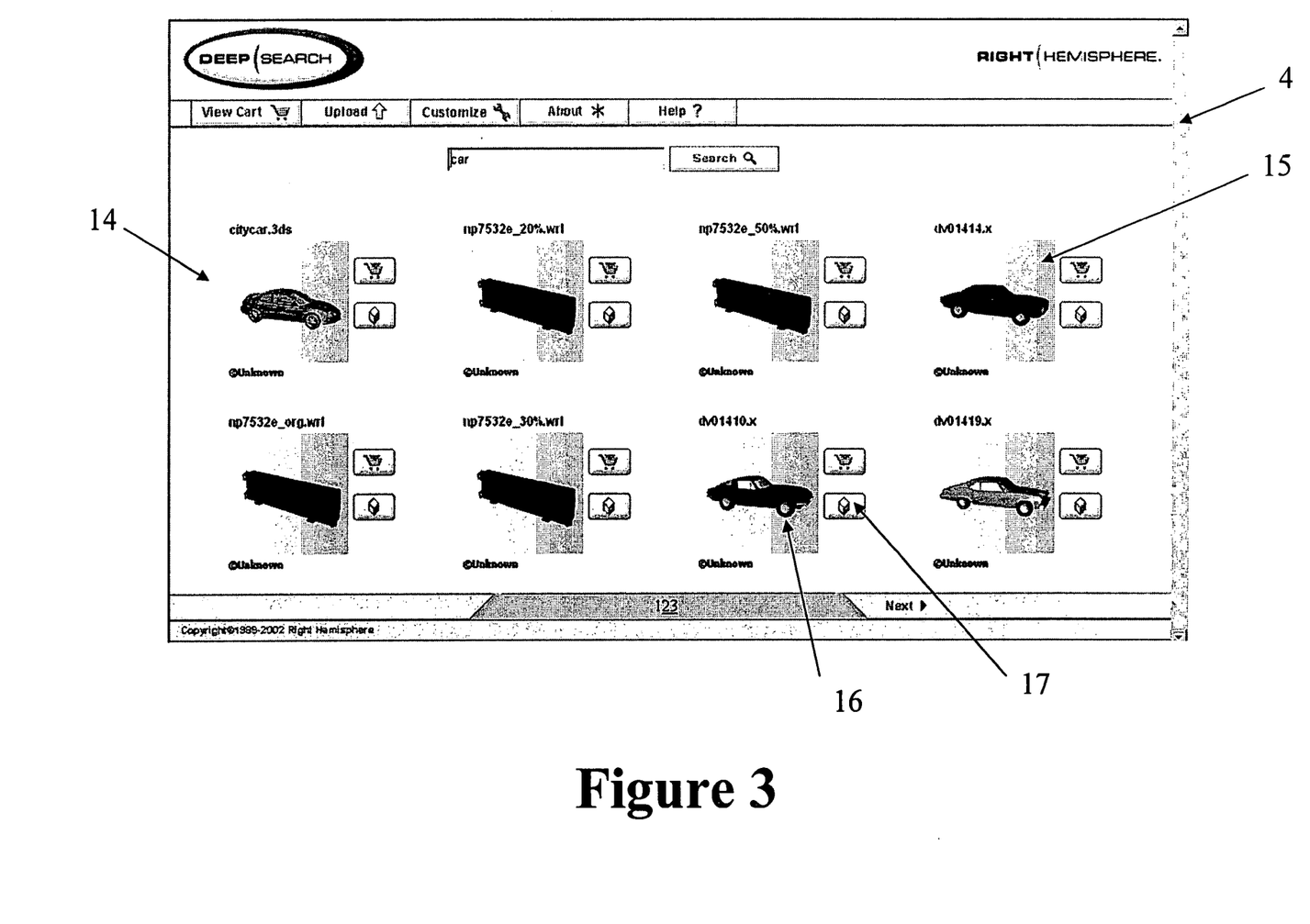
FIG. 3 is an example of the user interface where a user has entered the search term "car" and thumbnails of the resulting graphic files are shown.
Figure 4:
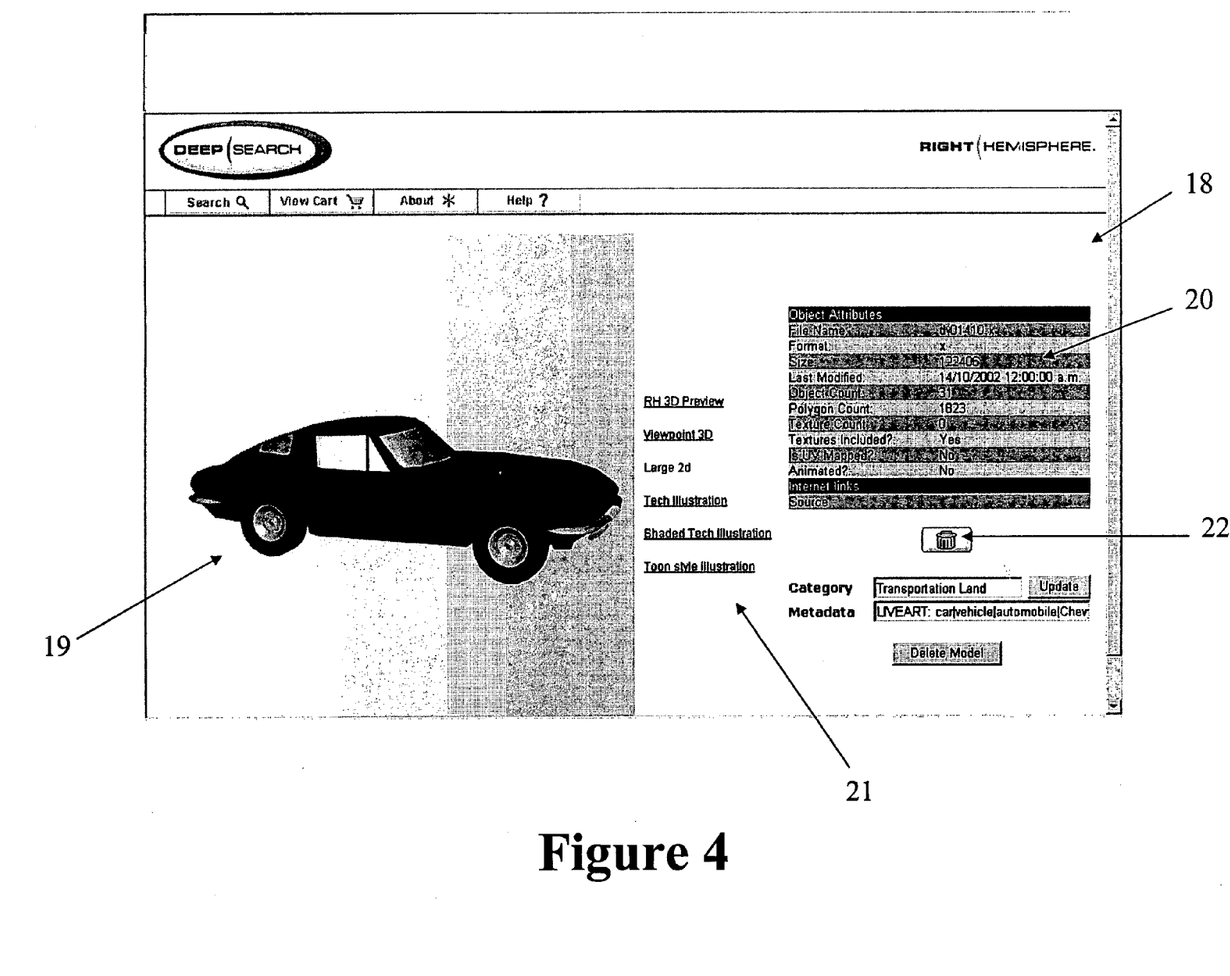
FIG. 4 is an example of the user interface where one graphic file has been selected and a preview of a two dimensional image of the file is shown.

Referring now to FIG. 3, if for example a user entered the keyword "car", a number of graphic files, generally indicated as 14, are displayed within the user interface 4. As shown in FIG. 3, and in the preferred form of the present invention, a thumb nail view, one of which is indicated in FIG. 3 as 15, of each graphic file that meets the search criteria is displayed within the user interface 4. In order for a user to preview a particular graphic file, for example, the image indicated as 16 in FIG. 3, a user merely needs to select the preview button 17 at which stage the user interface will bring up the preview screen 18 as shown in FIG. 4. The preview screen 18, in this example, shows a large two dimensional diagram of the graphic file named DV01410.X and indicated as reference numeral 19. Also displayed in the preview screen 18 are the object attributes of the graphic file 20, these include but are not limited to the file name, the file format, the size of the file, when it was last modified, whether textures are included and whether it is animated. Also provided on the preview screen 18 are other formats of the graphic file, generally indicated as 21 in FIG. 4. An example of five other formats created by the server 1 and viewable by the user are shown in preview screen 18, these are; a three dimensional preview in .RH file format, a three dimensional preview in viewpoint, a technical illustration, a shaded technical illustration and a toon style illustration. Some of these views may be able to be accessed by the user and downloaded for use, such as in published media, or simply to amend, manipulate or update.

A user may add the particular image or file to a cart in order to "checkout" the image for use, manipulation or updating, by selecting the checkout button 22.

Figure 5:
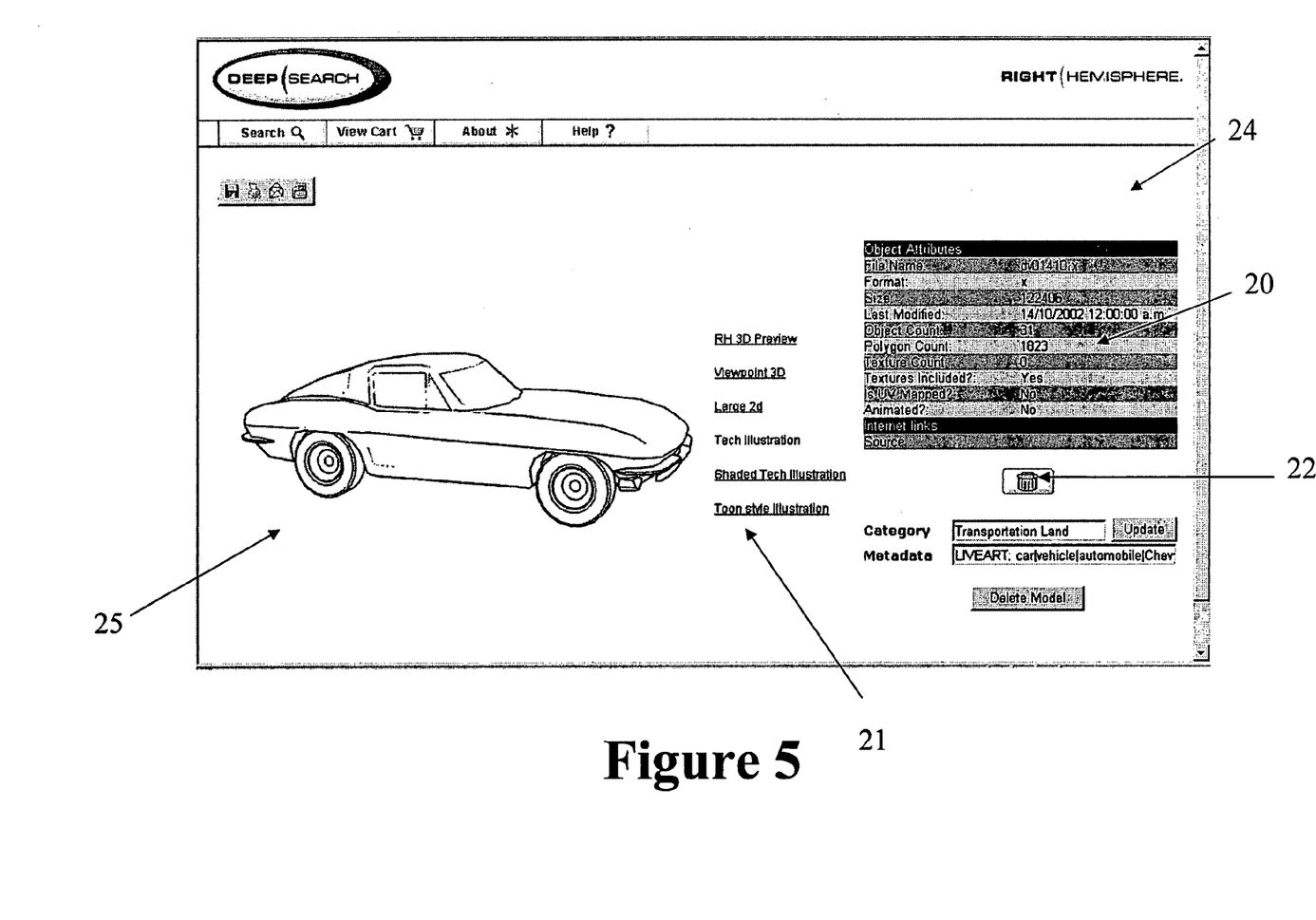
FIG. 5 is an example of the user interface where an alternative preview, namely the technical illustration of the graphic files as shown in FIG. 4 is shown.
Figure 6:
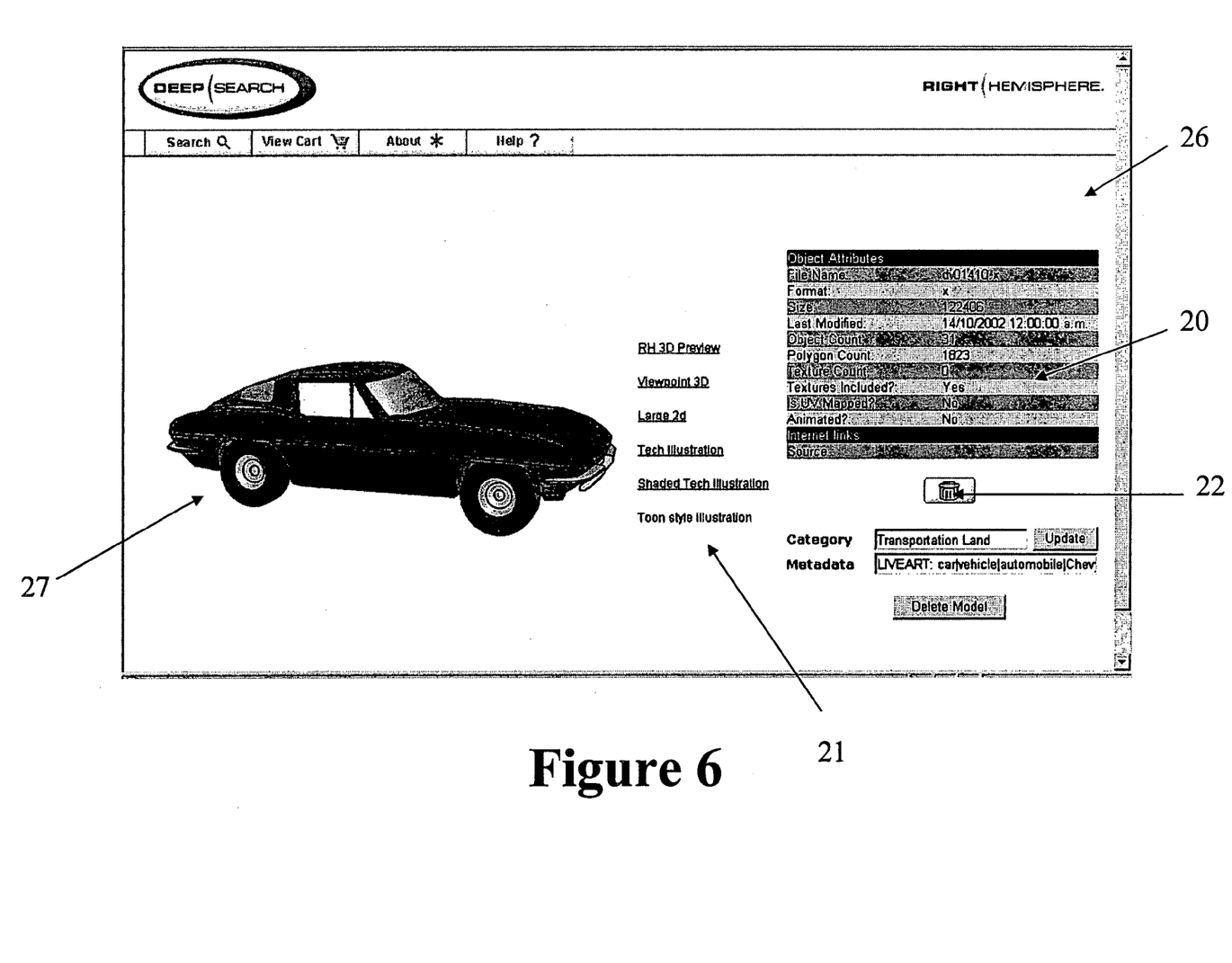
FIG. 6 is an example of the user interface where a further alternative preview, namely the toon style illustration of the graphic file as shown in FIG. 4 is shown.

If a user wishes to view any of the other formats 21 they can do so by using their mouse to click over each of the text indicating which format it is, for example, FIG. 5 shows the user interface 24 when viewing of the technical illustration 25 has been selected by the user. As a further example, the user interface 26 shows a preview of the toon style illustration 27 when that format has been selected by a user.

Figure 7:
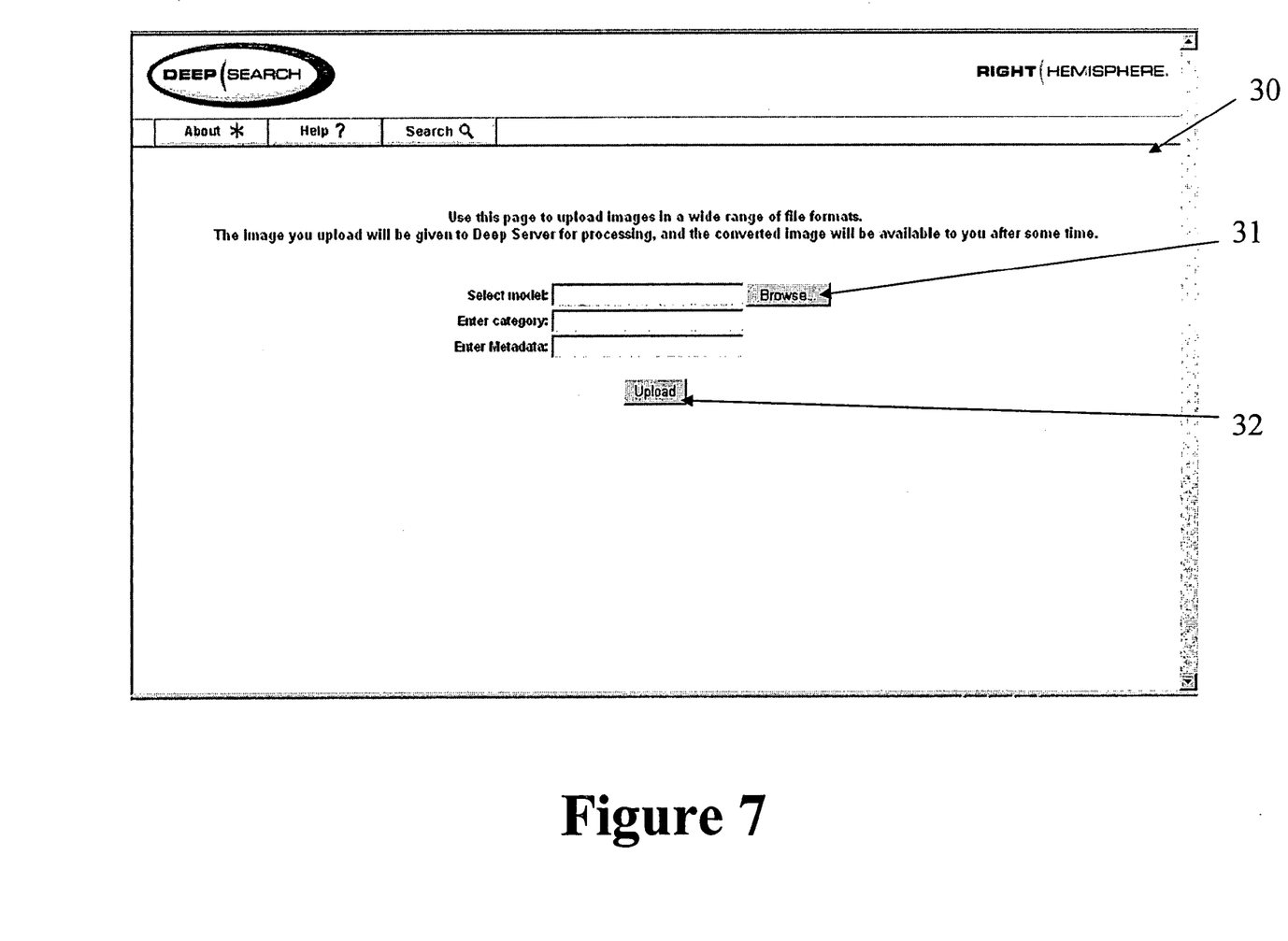
FIG. 7 is an example of the user interface screen that enables a user to upload graphic files to their personal computer or computer network.

Referring now to FIG. 7 an example of the user interface screen 30 is shown where there is an interface that allows a user to upload graphic files into the server 1 and database 2. The user can browse their computer directories, using the browse button 31, for graphic files, and upload files to the server 1 and store these in the database 2 or server 1. As described above, once a particular file has been selected and the upload button 32 has been pressed by the user, the file is uploaded into the server and stored in the database or server and at the same time the server creates at least one, but usually a number of different formats of the file (for example, those discussed above in relation to FIGS. 4 and 5). In other forms a graphic file may simply be linked into the server and database and remain on the computer network, not stored on the server and/or database.

Figure 8:
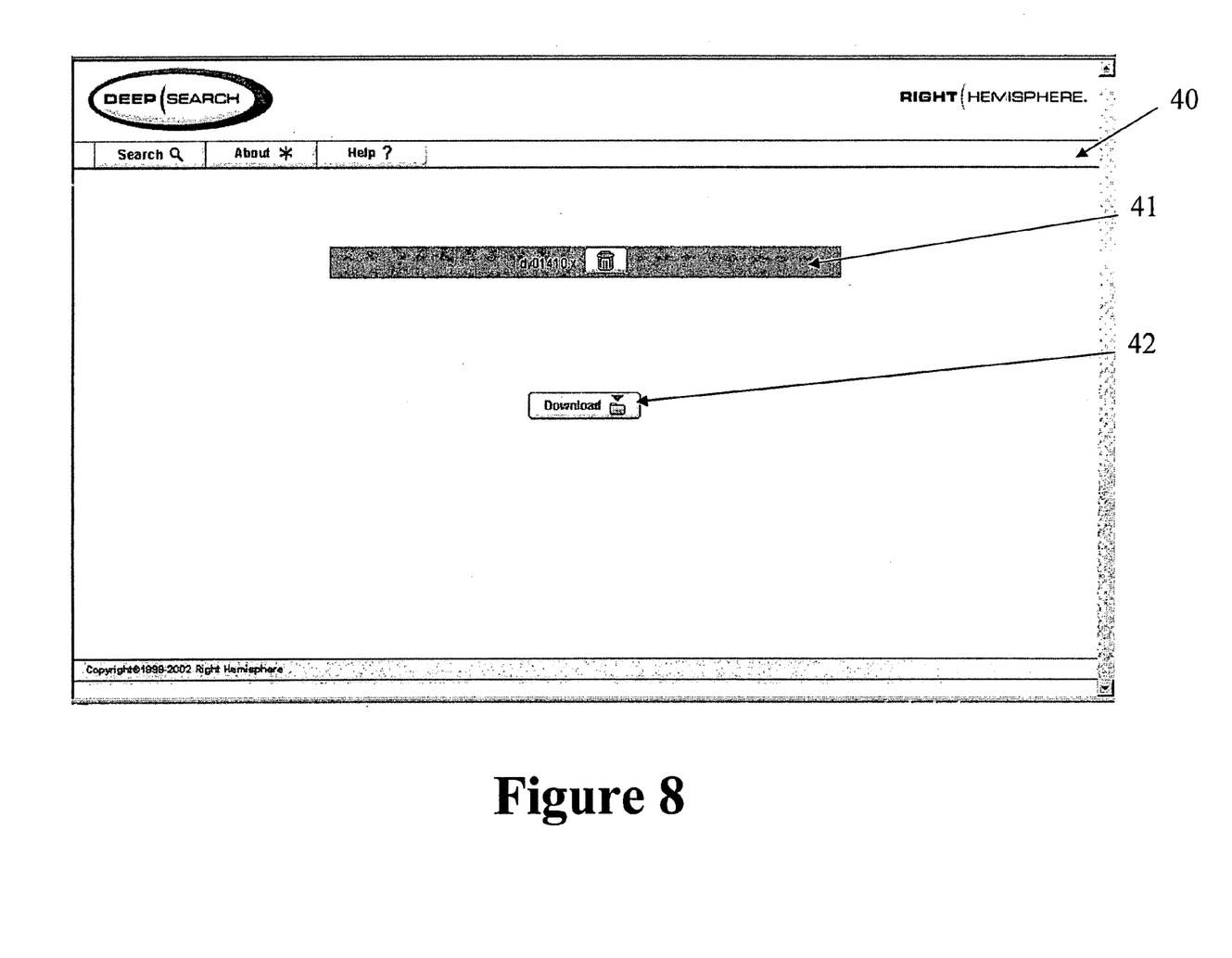
FIG. 8 is an example of the user interface screen showing the cart having the chosen graphic file and the download button allowing for checking out of the graphic file.

Referring now to FIG. 8, when graphic files such as that image discussed in relation to FIG. 4 has been added to a cart in order for a user to check out the document for use, amendment or manipulation ("re-purposing"), the cart screen 40 shows the file, for example electronic file "DV01410.X", generally indicated as 41 in the cart screen

40. In order to download or check out this file for use the user must select the download button 42 and choose a location on their personal computer or workstation in which to save the file. The server checks out the file and saves a copy at the location requested by the user. Once a user has manipulated or amended the file, for example, adding animation or surface material changes, the user can then check the file (with animation) back into the server 1. The server 1 and database 2 are capable of recognizing that the file has been amended and retains the original file as well as the updated image in the database and/or UGDM, or at least a link to these files.

Building a Graphic File Database

The server 1 of the system of the present invention can be instructed by a web browser or other software application to scan or search pre-defined directories of graphic files across logical computer drives, an intranet or the Internet actively seeking graphic files and changes to graphic files recording these changes on the server 1. As the server 1 scans the drives for graphic files it generates thumbnails and 3D web proxies of all supported graphic files formats and catalogues these into a database 2, allowing the graphic files to be made available to and searchable by other users.

The system of the present invention thus allows every user within an organization to easily access and use, via a computer network, the same graphic files without having to open the image in the original file format; therefore there is no need to install every graphic file format supporting application on every computer workstation within an organization. Within the above computer programs or applications, or web browsers the user can see each of the different versions (levels of detail) of the graphic file pre-generated by the server 1.

Altering and Maintaining Graphic Files

The system of the present invention is capable of maintaining a connection between the source data of a particular graphic file and incremental changes made to its other versions manually by users or automatically by the server. For example, a CAD file is 'checked in' or uploaded to the server and automatically converted to a .3DS file by the server. The .3DS file may be exported by a user who adds animations that explodes the parts making up the image thereby adding material attributes to parts of the image. This altered .3DS file can then be checked back into the server. The server is capable of remembering the differences between the original checked out file and this newly imported file, in such a way that if the original CAD file is once again checked in as a new version, then the server will take all possible steps to reconnect the additions made by the user above to the automatically converted the .3DS file that the server creates upon upload to the database. In this way additional information and add-ins to the graphic files is not lost. Specifically, if a 3D model of a cell phone with a lid was imported in CATIA™ format into the server, the server automatically makes a 3DS file of it. Furthermore, if this new .3DS file is further animated by a user in 3dstudio Max to add animation of the lid opening, when a new version of the original CATIA™ model is checked into the server then the system will attempt to keep this animation information so that the newly generated .3DS file already has an animating lid. The server maintains graphic files in this manner by keeping representations of the components of each electronic file in separate areas and maintaining the connection between them using links. These links are not broken when the components are changed.

Due, in part, to the same mechanism above the server allows for defining of relationships between files in order to maintain them in the same fashion. As an example, if a user wished to import a 3D model of a helicopter into the server for use and that helicopter is composed of a number of assemblies, where each of these assemblies is composed of sub-assemblies. These assemblies are usually of such a size that the entire helicopter cannot be loaded into a viewer at the same time. However, as each sub-assembly is submitted to the server, the server generates at least one simplified version of the sub-assembly and could effectively generate several. Note should be made that the number of versions created by the server is dependent on the metadata of each graphic file. If the relationship between these assemblies is defined, for example, how the rotor assembly connects to the drive shaft, then the server can load simpler versions of the graphic files and display them. This means the server can display the entire helicopter as one file. As the user more closely examines the object the server allows for the progressive loading and display of more detailed views of the assemblies, until the most detailed level is arrived at, for example the nuts and bolts of the helicopter. As data can be organized in different ways in the system the server allows a user to, for example, view the buttons on the helicopter control panel which lie directly adjacent to a piece of the fuselage. Even though these two items are a long way away from each other in the hierarchy of assemblies, they are close to one another physically. Furthermore, by mapping this physical space the server can also link together the assemblies at different levels of the hierarchy.

Furthermore, the server and system of the present invention is capable of managing data from multiple sources. For example, if a number of graphic files are wanted to be combined to form one large graphic files but each of the graphic files are in different formats as they were created by different computer users, the server can combine these into one graphic file. This is possible as the original file data is loaded along with its structural hierarchy information and original coordinate systems and stored in the database and UGDM. Original coordinate systems can then be modified to fit a larger global coordinate system and so spatial, logical or date related searches may then be made of the database.

The server of the present invention is also capable of maintaining a link to graphic files (usually, images) when it has been used in a computer application and saved in a separate electronic file. The link can then be used to update the graphic file (image) in the electronic file if the original file (image) is updated. For example, if a presentation in Powerpoint™ included a 2 dimensional picture that had been taken from the database and server, a link would exist between the copy of the picture in the presentation and the original picture in or linked to the server and/or database. If a user altered the original picture then as the server tracks these changes, upon completion of the changes and "checking back in" of the amended picture into the server, the server will automatically update the 2 dimensional picture in the presentation.

The user may also choose not to use a linked file. To do this the user simply inserts the file to the marketing brochure (for example) without inserting the file as a link.

3D Models and Animation

The graphic file management system of the present invention stores graphic files of 3D models and/or animation in such a way as to allow multiple users to edit model or animation data that may be in any different file formats, for example, .RH format (a proprietary format of Right Hemisphere Limited), .3DS, .DXF, .OBJ, and its XML and database equivalents and extensions are stored as part of the extensible "Universal Graphical Data Model" (UGDM). A user can load a .3DS file that has been automatically translated from another format by the server, for example, CAD format, into a useable format, for example .OBJ file format, and the user can make additions to the .OBJ file, such as animation and materials shaders, by using known 3D model and animation software programs such as 3ds max™ 5 as described on http://www.discreet.com/products/3ds-max/, Deep Exploration™ of Right Hemisphere Limited as described at http://www.righthemisphere.com, or any other appropriate $3^{rd}$ party tools. If the original .CAD model is updated, as far as possible any data added prior to the change should remain within the server. This requires information such as interactivity, materials, animation; metadata and other data added to .CAD files to be stored in a separate linked file in XML or other database format.

Manipulation of 3D Digital Graphic Files

The graphic file management system of the present invention allows multiple 3D graphic files containing assemblies, sub-assemblies and parts to be disassembled and recombined in new ways and into potentially much larger assemblies than ever before possible for the purposes of project overview and management, interference checking, visualization, training, technical documentation, and many other purposes requiring more lightweight data of potentially much larger assemblies than have ever before been combined. This is achieved by the server as it breaks existing single files representing complex 3D model assemblies into sub-objects or sub-assemblies or parts and allowing separated viewing and control of these sub-assemblies or parts. The server has the ability to treat individual 3D model files as assemblies, and combine these with other assemblies or sub-assemblies as defined by other 3D model files together into one single master assembly. Also the server enables the applying of operations to each assembly, either before reducing an assembly or building up an assembly. For example, a user could instruct the server to show them everything in a one meter radius of are particular part of a 3D model, then using a special search algorithm the server will find all files in the server and database that has geometry bounding boxes within the spatial search criterion.

Some further examples of operations that may be performed on an assembly are:

1. changing the coordinate system (world space transformations) to better fit assemblies together,
2. creating a new assembly from the combined results of 3D model files and/or a simplification process and changing the file type so that a new assembly can be treated/modeled using different programs and techniques,
3. automatic and manual control of the generation of level of detail (LOD) for the assemblies,
4. allowing the ability to add/modify/remove mark-ups to chosen assembly levels,
5. ability to combine any operation with another operation,
6. comparing two or more assemblies, and understanding any differences,
7. ability to search and retrieve statistics from assemblies,
8. substituting or adding a new part to an assembly, and
9. automatic publishing of files to web pages.

The capability to reduce assemblies in this manner benefits end users by allowing the creation of 3D models to be delegated to separate teams more easily, electronic files can be located anywhere on a local hard drive, network, the Internet, or stored in the graphic file database or a combination of any of these. In particular, metadata and linking information is stored in the database and/or UGDM. Furthermore, the capability to reduce assemblies using the graphic file management system of the present invention benefits end users as it allows viewing of complex assemblies in different levels of detail suited to different output requirements. The capability of building assemblies together benefits end users by allowing the ability to combine separately created 3D model file together in the same world space, the ability for parts or subassemblies within a 3D model file to be combined with other 3D model files or parts or subassemblies, independently of the parts in the original 3D model file. Files can then be located anywhere on a local hard drive, network, the Internet, or stored in the graphic file database. The relationships between the assemblies are defined in a client user interface and controlled via the server and stored in the master project file. It is preferred that the master project file has a file extension that is XML based, so as to allow the ability of $3^{rd}$ parties to integrate new Operations and extract information from it.

We claim:

1. A graphic file management system that enables a user, having a computer connected to a computer network, to maintain, use and manipulate graphic files in a plurality of different electronic formats, which are stored on said computer network comprising:
    a server which can retrieve said graphic files available within said network and establish a link to each of said graphic files,
    a database on said network in which said server stores said links,
    an interface that allows said user access to said server,
    said server being programmed to:
    a) create at least one other file format for each of said graphic files when establishing said links, where said at least one other file format is stored on said network and is accessible to said user through said interface and said server,
    b) allow a user to select a graphic file and select from the available formats for said file,
    c) create a copy of said file so selected by a user,
    d) allow the user to manipulate said copy of said selected file,
    e) create a link between said selected file and said manipulated copy of said selected file,
    f) allow a user to embed said manipulated file into another file to create an embedded file,
    g) create a further link between said embedded file and said selected file, and
    h) update said embedded file through said further link if said selected file is further manipulated.

2. A graphic file management system according to claim 1 wherein said server is programmable to store a copy of each of said graphic files in said database.

3. A graphic file management system according to claim 1 wherein said server is programmable to search said computer network for graphic files and create links to each of said graphic files in said database.

4. A graphic file management system according to claim 1 or claim 3 wherein said server is programmable to search for manipulated graphic files linked to or stored in said database and creates links to said manipulated graphic files on said database.

5. A graphic file management system according to claim 1 or 3 wherein said user interface enables said user to view at least one other file format of each of said graphic files stored in or linked to said database.

6. A graphic file management system according to claim 1 wherein said server is programmable to combine at least two user selected graphic files, having different electronic formats, into a single graphic file having a predetermined electronic format.

7. A graphic file management system according to claim 1 wherein said server is programmable to divide a selected one of said graphic files into a plurality of graphic files.

* * * * *